US008854791B2

(12) United States Patent
Takahashi (10) Patent No.: US 8,854,791 B2
(45) Date of Patent: Oct. 7, 2014

(54) VOLTAGE CONTROLLED VARIABLE CAPACITOR AND VOLTAGE CONTROLLED OSCILLATOR (75) Inventor: Yutaka Takahashi, Sayama (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 492 days.

(21) Appl. No.: 12/928,605

(22) Filed: Dec. 15, 2010

(65) Prior Publication Data
US 2011/0149464 A1 Jun. 23, 2011

(30) Foreign Application Priority Data

Dec. 18, 2009 (JP) ................................. 2009-287795
Aug. 20, 2010 (JP) ................................. 2010-185432

(51) Int. Cl.
H01G 5/00 (2006.01)
(52) U.S. Cl.
USPC .......................................................... 361/277
(58) Field of Classification Search
CPC ........................................................ H01G 7/06
USPC .......................................................... 361/277
See application file for complete search history.

(56) References Cited

U.S. PATENT DOCUMENTS

| 6,172,378 | B1 * | 1/2001 | Hull et al. ........................ 257/14 |
| 7,183,867 | B2 | 2/2007 | Matsuura et al. |
| 7,183,870 | B2 | 2/2007 | Takagi |
| 2001/0000414 | A1 | 4/2001 | Fukayama et al. |
| 2004/0100752 | A1 | 5/2004 | Hiraoka et al. |
| 2005/0030116 | A1 | 2/2005 | Takagi |
| 2005/0083105 | A1 | 4/2005 | Matsuura et al. |
| 2005/0088249 | A1 | 4/2005 | Oehm et al. |
| 2005/0218947 | A1 * | 10/2005 | Tanaka ........................... 327/156 |
| 2008/0315277 | A1 * | 12/2008 | Nakashiba ..................... 257/312 |
| 2009/0140300 | A1 * | 6/2009 | Usami ............................ 257/288 |
| 2011/0057668 | A1 * | 3/2011 | Chen ............................. 324/655 |

FOREIGN PATENT DOCUMENTS

| CN | 1503454 | 6/2004 |
| CN | 1610246 | 4/2005 |
| CN | 101290935 | 10/2008 |
| JP | 2000-307129 | 11/2000 |
| JP | 2003-068869 | 3/2003 |
| JP | 2004-260301 | 9/2004 |
| JP | 2005-064691 | 3/2005 |
| JP | 2008-245259 | 10/2008 |

* cited by examiner

Primary Examiner — Vongsavnh Sengdara
(74) Attorney, Agent, or Firm — Jordan and Hamburg LLP (57) ABSTRACT There is provided a voltage variable capacitor that can be formed on a semiconductor circuit, has a large variable ratio of capacitances and a high Q value, and achieves a highly linear relation of a control voltage and an oscillation frequency when the capacitor forms a VCO. The voltage variable capacitor is formed of a plurality of MOS capacitance elements (CM1 to CMn) having lower electrodes connected in common, the same number of non-variable capacitors (C1 to Cn) having one ends connected to upper electrodes of the plurality of MOS capacitance elements and the other ends connected in common, and a unit (VB1 to VBn and resistors) applying different fixed bias voltages to connection points of these MOS capacitance elements and non-variable capacitors, in which a control voltage is applied to the lower electrodes connected in common of the plurality of MOS capacitance elements.

8 Claims, 12 Drawing Sheets

VOLTAGE CONTROLLED VARIABLE CAPACITOR AND VOLTAGE CONTROLLED OSCILLATOR

BACKGROUND OF THE INVENTION

1. Field of the Invention

The present invention relates to a voltage controlled variable capacitor with a capacitance that varies depending on a control voltage, and to a voltage controlled oscillator using the same.

2. Description of the Related Art

Figure 6:
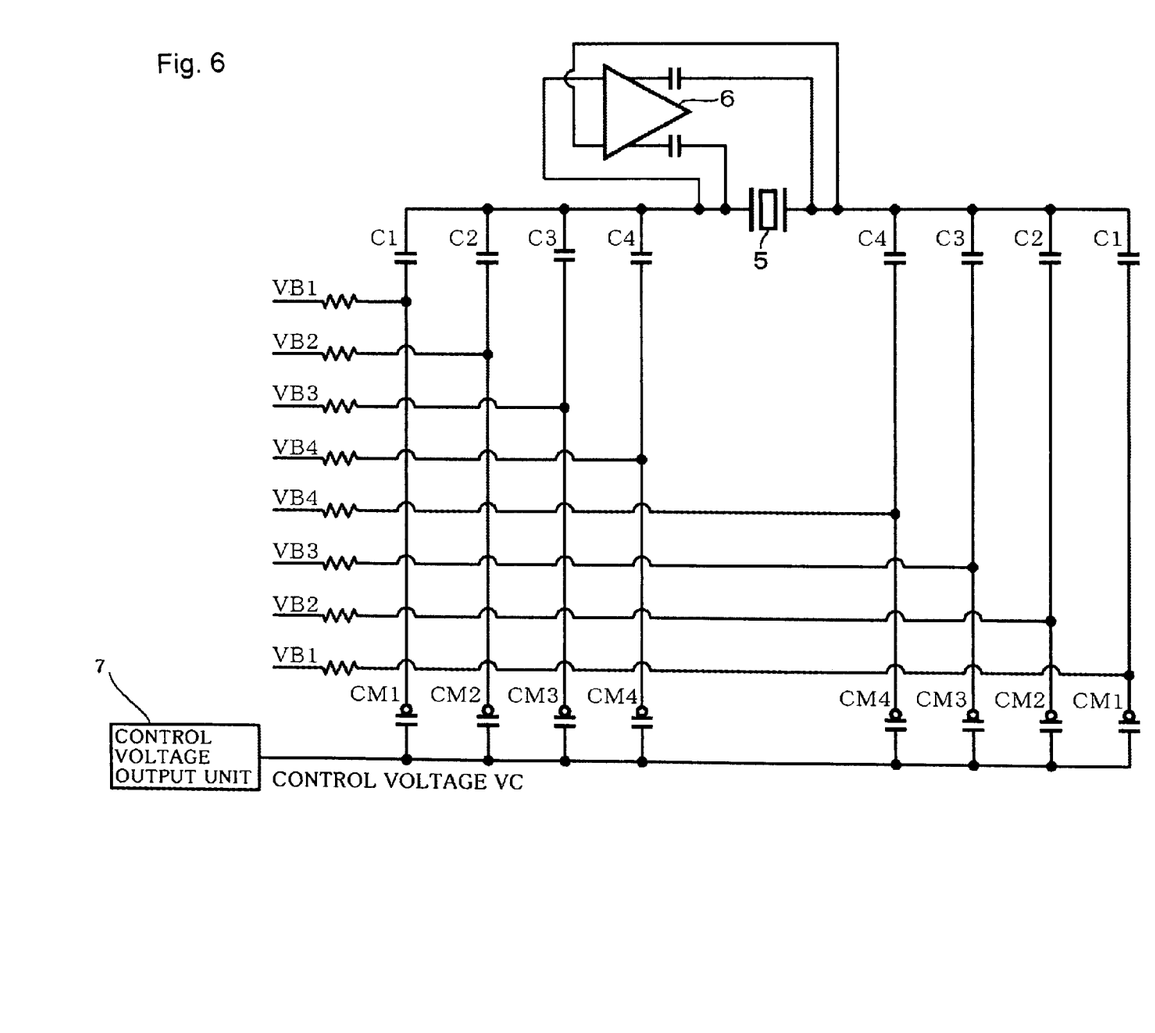
FIG. 6 is a circuit diagram illustrating a structure example of a circuit of a voltage controlled oscillator using the voltage controlled variable capacitor according to the first embodiment.

As voltage controlled variable capacitors that can be used on a semiconductor integrated circuit, there are known two types of capacitance elements, varactor diodes and MOS capacitance elements. The varactor diodes which can be fabricated on a semiconductor integrated circuit have a small variable ratio of capacitance values (a ratio between a minimum capacitance value and a maximum capacitance value) as illustrated in FIG. 6, and have a problem that a large frequency variable width cannot be obtained when being used in a voltage controlled oscillator circuit, or the like.

A voltage controlled oscillator such as VCXO (Voltage Controlled Crystal Oscillator) has a function to control its oscillation frequency by varying a capacitance value incorporated in an oscillator circuit with a control voltage applied from an outside unit. As this variable capacitance element, a varactor diode is generally used. However, the varactor diode which can be fabricated on an integrated circuit has a ratio between a minimum capacitance value and a maximum capacitance value as small as about double. This is due to that a PN junction with a steep gradient of concentration cannot be achieved by a process for forming the integrated circuit.

On the other hand, as voltage controlled variable capacitors with a wide capacitance variable width that can be fabricated on an integrated circuit, MOS capacitors are known. A MOS voltage controlled variable capacitor can achieve a variable width of about double the variable width of the varactor diode (PN-junction diode). However, the MOS voltage controlled variable capacitor changes in capacitance value steeply at a voltage (approximately 0.5 V) in the vicinity of a threshold (Vt) of a MOS transistor, and thus its capacitance value is liable to be modulated by noise components contained in the control voltage. Consequently, phase noise in the voltage controlled oscillator is deteriorated, and moreover there is a drawback that the linearity of a relation between the control voltage and the oscillation frequency is poor.

Accordingly, in FIG. 10 of Japanese Patent Application Laid-open No. 2005-64691, there is proposed a variable capacitor in which capacitors are connected to gate sides of MOS capacitance elements formed of MOS transistors each having a short-circuited source and drain, series circuits which are each formed thus of a MOS capacitance element and a capacitor are connected in parallel, and a control voltage is applied to the short-circuited part of the source and the drain and bias voltages are applied between the MOS capacitance elements and the capacitors. In this variable capacitor, the bias voltages differ among the series circuits from each other. Accordingly, when the control voltage is increased sequentially, the voltage between the gate and the source (drain) of each MOS capacitance element exceeds a threshold sequentially, and the capacitance value of the MOS capacitance element decreases. Therefore, the variable ratio of capacitances is large, but there is a drawback that a Q value of the variable capacitor is low because a parasitic resistance formed of an inversion layer is inserted in series in the capacitor.

It is an object of the present invention to provide a voltage variable capacitor which has a large variable ratio of capacitance values (ratio between a minimum capacitance value and a maximum capacitance value), is capable of achieving a highly linear relation between a control voltage and an oscillation frequency when the capacitor forms a voltage controlled oscillator for example, and has a high Q value. It is another object of the present invention to provide a voltage controlled oscillator which achieves a highly linear relation between a control voltage and an oscillation frequency and has a large adjustable width of an oscillation frequency.

A voltage controlled variable capacitor according to the present invention includes:

(1) using a plurality of MOS capacitance elements each including an N-type well layer formed in a silicon layer, a gate electrode formed on the well layer via a gate oxide film, and a contact layer formed of an $N^+$ layer containing a higher concentration of N-type impurities than that of the well layer and formed at a position separated from the gate electrode in a surface direction in the well layer;

(2) electrically connecting respective contact layers of the plurality of MOS capacitance elements in common;

(3) providing a bias voltage supply unit for supplying bias voltages different from each other to gate electrodes of the respective MOS capacitance elements;

(4) providing a plurality of non-variable capacitance elements having one ends connected respectively to the gate electrodes of the MOS capacitance elements, and the other ends connected in common; and (5) setting a difference between bias voltages of adjacent voltages smaller than a threshold voltage Vt, where Vt is a threshold voltage at a time when a source and a drain are formed in the well layer of one of the MOS capacitance elements to make a MOS transistor, in which a control voltage is supplied to the contact layers to thereby control a capacitance value between a common connection point of the plurality of MOS capacitance elements and a common connection point of the plurality of non-variable capacitance elements.

A capacitance portion of each of the non-variable capacitance elements is provided to overlap with the gate electrode for example.

A voltage controlled variable capacitor of another invention includes:

(1) using a plurality of MOS capacitance elements each including a P-type well layer formed in a silicon layer, a gate electrode formed on the well layer via a gate oxide film, and a contact layer formed of a $P^+$ layer containing a higher concentration of P-type impurities than that of the well layer and formed at a position separated from the gate electrode in a surface direction in the well layer;

(2) electrically connecting respective gate electrodes of the plurality of MOS capacitance elements in common;

(3) providing a bias voltage supply unit for supplying bias voltages different from each other to contact layers of the respective MOS capacitance elements;

(4) providing a plurality of non-variable capacitance elements having one ends connected respectively to the contact layers of the MOS capacitance elements, and the other ends connected in common; and (5) setting a difference between bias voltages of adjacent voltages smaller than a threshold voltage Vt, where Vt is a threshold voltage at a time when a source and a drain are formed in the well layer of one of the MOS capacitance elements to make a MOS transistor, in which a control voltage is supplied to the gate electrodes to thereby control a capacitance value between a common connection point of the plurality of MOS capacitance elements and a common connection point of the plurality of non-variable capacitance elements.

A voltage controlled variable capacitor according to still another invention includes:

(1) using a plurality of MOS capacitance elements each including an N-type well layer formed in a silicon layer, a gate electrode formed on the well layer via a gate oxide film, and a contact layer formed of an $N^+$ layer containing a higher concentration of N-type impurities than that of the well layer and formed at a position separated from the gate electrode in a surface direction in the well layer;

(2) electrically connecting respective contact layers of the plurality of MOS capacitance elements in common;

(3) providing a bias voltage supply unit for supplying bias voltages different from each other to gate electrodes of the respective MOS capacitance elements;

(4) setting a difference between bias voltages of adjacent voltages smaller than a threshold voltage Vt, where Vt is a threshold voltage at a time when a source and a drain are formed in the well layer of one of the MOS capacitance elements to make a MOS transistor, in which a control voltage is supplied to the contact layers to thereby control a capacitance value between a common connection point of the plurality of MOS capacitance elements and gate electrode sides of the MOS capacitance elements.

A voltage controlled variable capacitor according to yet another invention includes:

(1) using a plurality of MOS capacitance elements each including a P-type well layer formed in a silicon layer, a gate electrode formed on the well layer via a gate oxide film, and a contact layer formed of a $P^+$ layer containing a higher concentration of P-type impurities than that of the well layer and formed at a position separated from the gate electrode in a surface direction in the well layer;

(2) electrically connecting respective gate electrodes of the plurality of MOS capacitance elements in common;

(3) providing a bias voltage supply unit for supplying bias voltages different from each other to contact layers of the respective MOS capacitance elements;

(4) setting a difference between bias voltages of adjacent voltages smaller than a threshold voltage Vt, where Vt is a threshold voltage at a time when a source and a drain are formed in the well layer of one of the MOS capacitance elements to make a MOS transistor, in which a control voltage is supplied to the gate electrodes to thereby control a capacitance value between a common connection point of the plurality of MOS capacitance elements and contact layer sides of the MOS capacitance elements.

According to another invention, in a voltage controlled oscillator using a voltage controlled variable capacitor, the voltage controlled variable capacitor according to the present invention is used.

According to the present invention, electrodes on one end sides of the plurality of MOS capacitance elements are connected in common and the control voltage is applied to the common connection point thereof. A bias voltage is applied to electrodes on the other end sides of the MOS capacitance elements via a bias resistor, and there is provided a plurality of non-variable capacitance elements having one ends connected respectively to the gate electrodes of the MOS capacitance elements without intervention of the bias resistor, and the other ends connected in common.

In another invention, electrodes on one end sides of the plurality of MOS capacitance elements are connected in common and the control voltage is applied to the common connection point thereof, and the bias voltage is applied to electrodes on the other sides of the MOS capacitance elements.

In any one of the inventions, voltages of adjacent bias voltages are set smaller than the threshold voltage. Thus, the capacitance values of the MOS capacitance elements decrease sequentially when the control voltage is increased. Therefore, it is possible to obtain a voltage-controlled variable capacitor which can be formed on an integrated circuit, has a large variable ratio of capacitances, and can achieve a highly linear relation between the control voltage and an oscillation frequency when a VCO is formed. Further, a voltage controlled variable capacitor with a high Q value can be obtained.

DETAILED DESCRIPTION OF THE PREFERRED EMBODIMENT(S)

Figure 1:
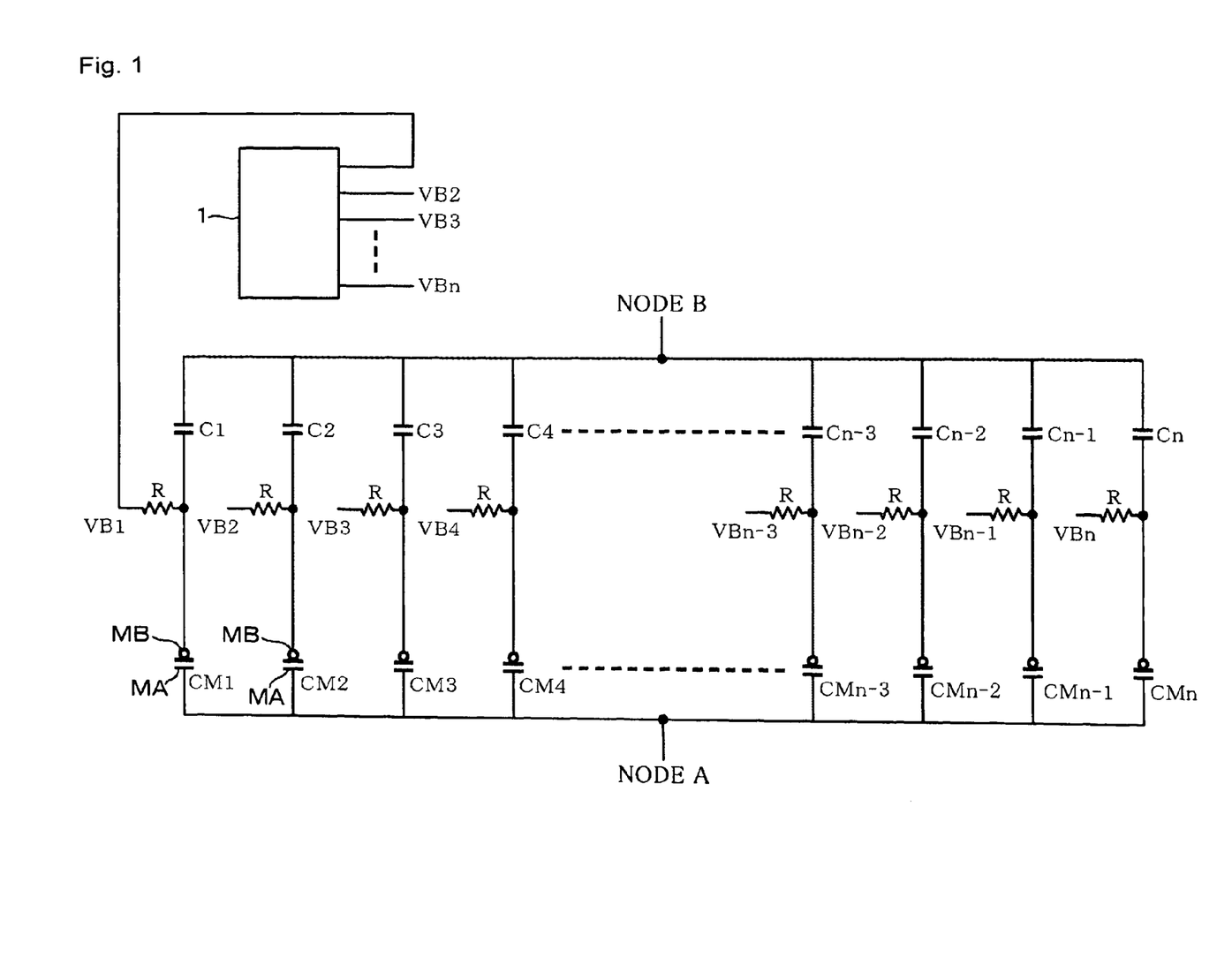
FIG. 1 is a circuit diagram illustrating a first embodiment of a voltage controlled variable capacitor of the present invention.

FIG. 1 illustrates a circuit configuration of a voltage controlled variable capacitor according to a first embodiment of the present invention. Symbols CM1 to CMn denote MOS capacitance elements, and electrodes MA on one end sides of these MOS capacitance elements CM1 to CMn are connected to a common node A. Electrodes MB on the other end sides of the MOS capacitance elements CM1 to CMn are connected to one end sides of the capacitors C1 to Cn, respectively, which are non-variable capacitance elements. Note that symbols of the electrodes MA and MB for the MOS capacitance elements CM1, CM2 are shown as representatives. The other end sides of the capacitors C1 to Cn are connected to a common node B. Therefore, in this configuration, a series circuit formed of the MOS capacitance element CM1 and the capacitor C1, a series circuit formed of the MOS capacitance element CM2 and the capacitor C2, . . . , a series circuit formed of the MOS capacitance element CMn and the capacitor Cn are connected in parallel with each other between the node A and the node B.

Between each MOS capacitance element CMk and each capacitor Ck, a bias voltage (DC voltage) VBk is supplied from a bias voltage supply unit 1. One end side of the bias voltage supply unit 1 is grounded. Here, symbol k denotes an integer from 1 to n, and is used for simplifying the description. Specifically, a bias voltage VB1 is supplied between the MOS capacitance element CM1 and the capacitor C1, a bias voltage VB2 is supplied between the MOS capacitance element CM2 and the capacitor C2, . . . , a bias voltage VBn is supplied between the MOS capacitance element CMn and the capacitor Cn. Symbol R denotes a resistor having a resistance value of 100 kΩ or higher for example, and DC voltage values on both ends of a resistor R are the same. The bias voltage VBk will be described later.

Here, it is desired that a resistance value of the resistor (bias resistor R) between the bias voltage supply unit 1 and the connection point of each MOS capacitance element CMk and each capacitor Ck be as large as possible for increasing a Q value of the capacitor. However, for structuring on an integrated circuit, this should be considered together with a trade-off between an area (=cost) and a characteristic. In general, it is necessary to set the resistance value of the bias resistor R to a value sufficiently larger than respective impedances of the MOS capacitance element CMk and the capacitor Ck at an oscillation frequency f0. The impedances are each given by $1/(2\pi \cdot f0 \cdot CMk)$ and $1/(2\pi \cdot f0 \cdot Ck)$, and the resistance value of the bias resistor R is desirably a value larger than the value of the larger one of these impedances by two digits or more.

In the embodiment of FIG. 1, there is achieved a voltage controlled variable capacitor in which a capacitance value between a common connection point of the MOS capacitance elements CM1 to CMn and a common connection point of the capacitors C1 to Cn, which are non-variable capacitors, is controlled by applying a control voltage from a not-illustrated control voltage supply unit to the node A commonly connected to the plurality of MOS capacitance elements CM1 to CMn. When this voltage controlled variable capacitor is used for a crystal oscillator circuit, a crystal resonator which is an oscillation element is connected to the node B.

Figure 2:
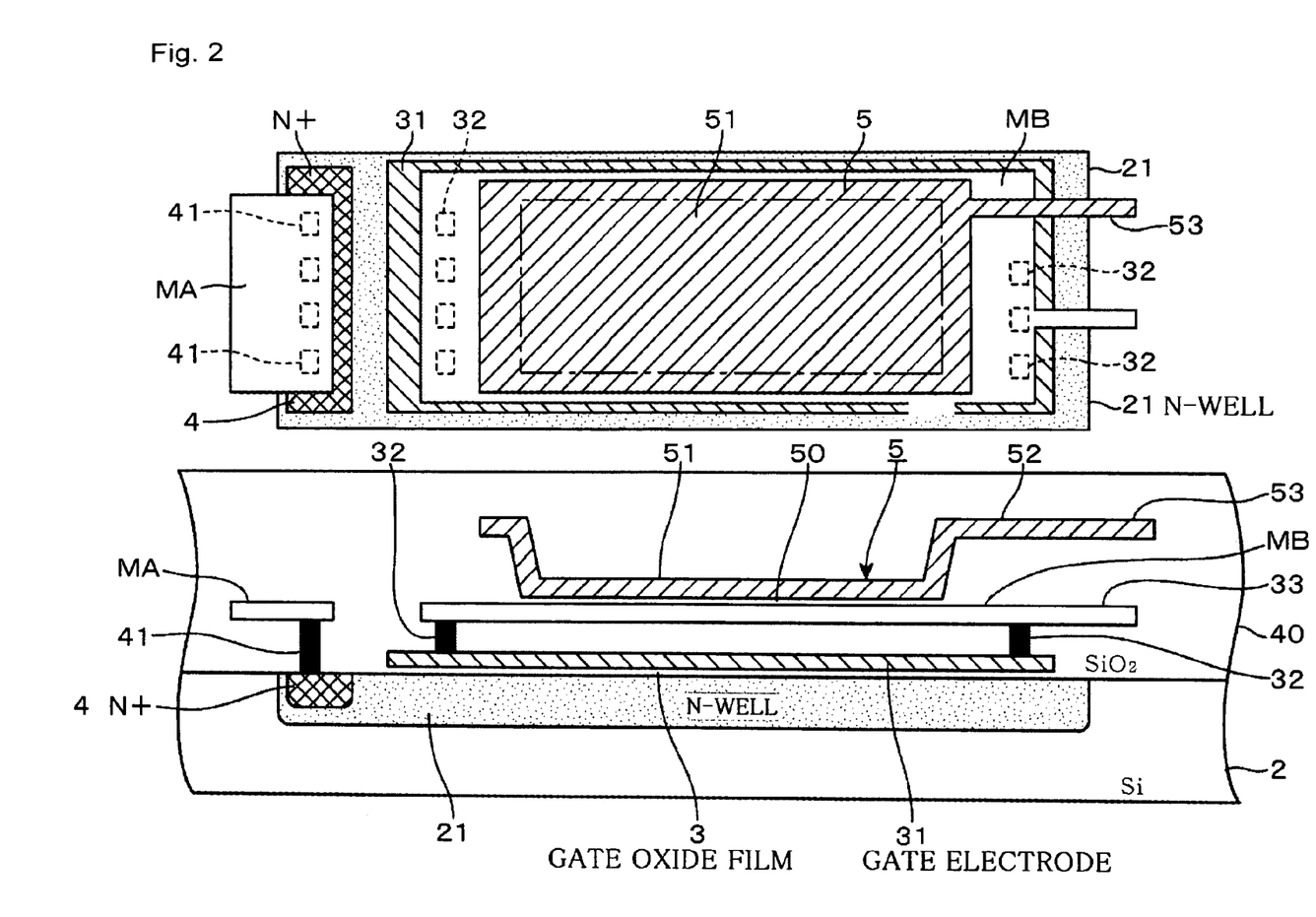
FIG. 2 is a plan view and a cross-sectional view illustrating a structure of a MOS capacitance element used in the first embodiment.

FIG. 2 illustrates a structure of the MOS capacitance elements CM1 to CMn. Numeral 2 denotes a silicon (Si) substrate, and a silicon oxide ($SiO_2$) film 40 is stacked on this silicon substrate 2. The silicon substrate 2 and the silicon oxide ($SiO_2$) film 40 are not hatched for ease of understanding this drawing. An N-well layer 21 which is an N-type well layer in a rectangular planar shape is formed on a surface layer portion of the silicon substrate 2. A gate electrode 31 formed of a poly-silicon film for example is provided on this N-well layer 21 via a gate oxide film 3. The gate oxide film 3 corresponds to a thin portion of the silicon oxide film 40 between the N-well layer 21 and the gate electrode 31. The gate electrode 31 is formed in a rectangular planar shape slightly smaller than the N-well layer 21. Above this gate electrode 31, an electrode MB formed of aluminum for example in a rectangular planar shape slightly smaller than the gate electrode 31 is disposed opposing the gate electrode 31 via an insulating layer (part of the silicon oxide film 40). Further, a lead-out electrode 33 is led from one end portion of this electrode MB. A bias voltage is applied to this lead-out electrode 33, and this bias voltage is applied to the gate electrode 31 via the electrode MB and a conductive path 32. As can be seen from FIG. 2(a), a plurality of, three for example, conductive paths 32 are provided in an island-like shape at intervals from each other along a short side on an end portion on the lead-out electrode 33 side in the electrode MB. Further, a plurality of, four for example, conductive paths 32 are provided in an island-like shape at intervals from each other along a short side on an end portion on the side opposite to the lead-out electrode 33 in the electrode MB.

The gate electrode 31 and the electrode MB are connected by the plurality of conductive paths 32 along both the short sides of this electrode MB. Further, an electrode 5 formed of aluminum for example is provided above the electrode MB. This electrode 5 includes an opposing electrode 51 in a rectangular shape opposing the electrode MB via a thin insulating layer 50 which is a part of the silicon oxide film 40, and a circumferential portion 52 extending obliquely upward from the entire circumferential portion of this opposing electrode 51. In the circumferential portion 52, a lead-out electrode 53 is connected to the side of an end portion where the lead-out electrode 33 is led out.

On the other hand, in a portion in the N-well layer 21 which is separated from the gate electrode 31, there is provided a sub-contact part 4 which is a contact layer formed of an $N^+$ layer containing more N-type impurities than the N-well layer 21. This sub-contact part 4 is formed in a rectangular planar shape when seen in a plan view at a distance alongside a short side of the gate electrode 31. On this sub-contact part 4, conductive paths 41 are formed to stand up, which are aligned in one row in an island-like shape along a longitudinal direction of the sub-contact part 4 (short side direction of the gate electrode 31). An electrode MA in a planar shape formed of aluminum for example is provided on these conductive paths 41. This electrode MA is at the same height position as the electrode MB in this example, and is disposed alongside the electrode MA separately.

Although conceivably it is easy to be understood by checking reference symbols and numerals between FIG. 1 and FIG. 2, the correspondence between these diagrams will be described just to be sure. The electrode MA connected to the sub-contact part 4 in FIG. 2 corresponds to the lower side electrodes of the MOS capacitance elements (CM1 to CMn) in FIG. 1, and is connected to the node A. The electrode MB opposing the gate electrode 31 in FIG. 2 corresponds to the upper side electrodes of the MOS capacitance elements (CM1 to CMn) in FIG. 1, and is connected to the bias voltage supply unit 1.

Further, in FIG. 1, the thin insulating layer 50 which is a part of the silicon oxide film 40 intervening between the electrode MB and the opposing electrode 5 corresponds to each capacitance component of the capacitors C1 to Cn, which are non-variable capacitance elements. In short, although each MOS capacitance element CMk and each capacitor Ck are drawn as if being connected by a conductive path in FIG. 1, the lower side electrode of the capacitor Ck in FIG. 1 is combined with the electrode MB in FIG. 2, and the upper side electrode of the capacitor Ck in FIG. 1 corresponds to the electrode 53 in FIG. 2. Thus, the electrode 53 is connected to the node B.

Next, operation of the circuit in FIG. 1 will be described. As already described, the MOS capacitance element has a drawback that its capacitance value changes rapidly at a bias near a threshold voltage of a transistor. To solve this drawback, the bias voltages VB1 to VBn are supplied to the MOS capacitance elements CM1 to CMn, respectively. The relation of the voltages VB1 to VBn is set as VB1<VB2<VB3< . . . VBn−1<VBn, and a difference between adjacent bias voltages (VB(k+1)−VBk) is set smaller than a threshold voltage (Vt) of the MOS transistor. Here, a solid line (1) in FIG. 12 indicates a capacitance change when the voltage of the gate electrode 31 is changed in a state that the sub-contact part 4 is grounded in the MOS capacitance element illustrated in FIG. 2. As can be seen from FIG. 12, when a difference in the voltage of the gate electrode 31 from the voltage on the sub-contact part 4 side (voltage of the gate electrode 31−voltage on the sub-contact part 4 side) becomes smaller than the threshold voltage, the capacitance of the MOS capacitance element decreases rapidly.

Figure 12:
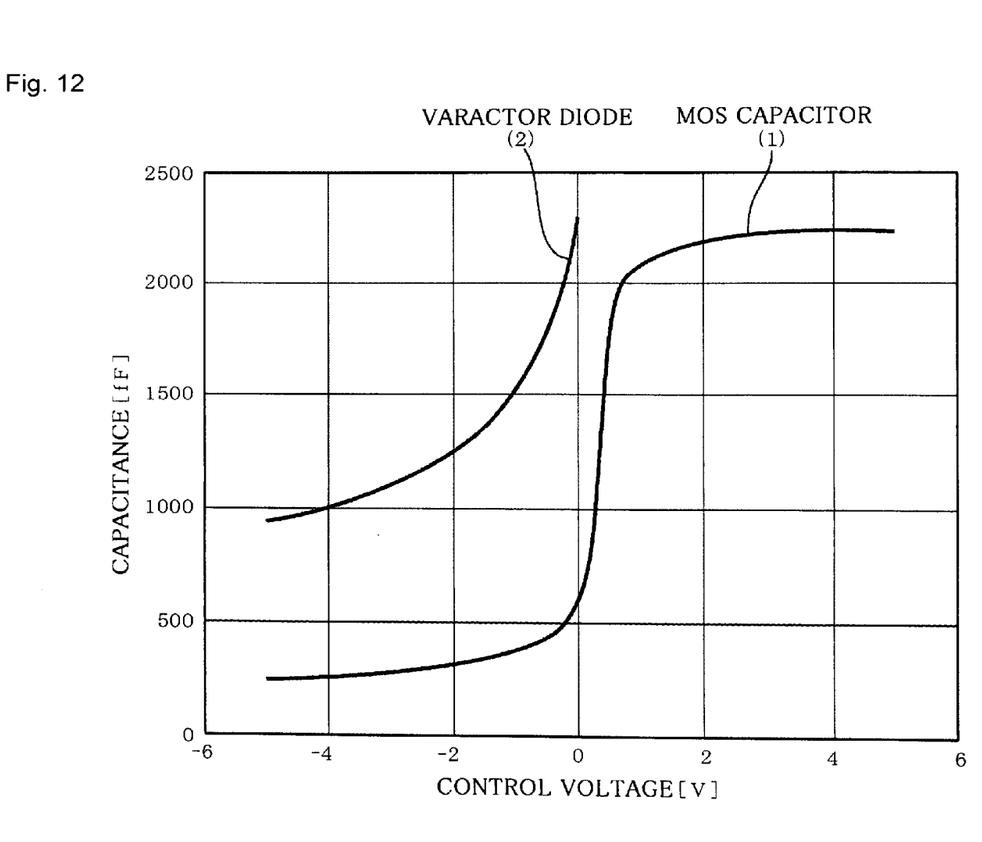
FIG. 12 is a characteristic chart illustrating a relation between a control voltage and a capacitance value with respect to a varactor diode and a MOS capacitance element.

Accordingly, when the control voltage applied to the node A is increased gradually from a voltage lower than the bias voltage VB1, first the capacitance value of the MOS capacitance element CM1 decreases, and the capacitance between the nodes A, B decreases. In the case of FIG. 12, the voltage of the gate electrode 31 is changed in a state that the sub-contact part 4 is grounded, but in the case of FIG. 1, the voltage of the sub-contact part 4 is increased in a state that a fixed bias is applied to the gate electrode 31. To describe with reference to FIG. 12, this means moving on the graph (1) from right to left (a difference voltage obtained by subtracting the voltage on the sub-contact part 4 side from the voltage of the gate electrode 31 decreases). Therefore, this difference voltage decreases gradually, and the capacitance value of the MOS capacitance element CM1 decreases in the vicinity of the bias voltage VB1.

Since the difference between adjacent bias voltages is set smaller than the threshold voltage (Vt) of the MOS transistor, when the voltage of the node A is increased further, the difference voltage gets close to the vicinity of the bias voltage VB2 with respect to the MOS capacitance element CM2 before the change of the capacitance value of CM1 proceeds from a rapid area to a gradual area. Thus, the capacitance value of the MOS capacitance element CM2 starts to decrease. By thus increasing the control voltage (voltage of the node A) gradually, the capacitance values of the MOS capacitance elements CM1 to CMn steeply decrease sequentially, that is, the capacitance values vary like, so to speak, a baton relay race, and so the capacitances can be varied between the nodes A, B.

What becomes a problem here is parasitic capacitance at each connection point between the MOS capacitance elements CM1 to CMn and the capacitors C1 to Cn, which are non-variable capacitance elements. This parasitic capacitance acts as a fixed capacitance between the MOS capacitance elements and the semiconductor substrate, and thus leads to decrease in the variable ratio of the MOS capacitance elements. However, as illustrated in FIG. 2, by disposing the non-variable capacitance elements on the upper side of the MOS capacitance elements, more specifically, by combining the lower side electrodes of the capacitors C1 to Cn with the gate side electrodes of the MOS capacitance elements, the influence of the parasitic capacitance can be eliminated. The electrodes combined with each other are connected to the same potential, and thus decrease in the variable ratio of the capacitances of the MOS capacitance elements would not occur.

Figure 3:
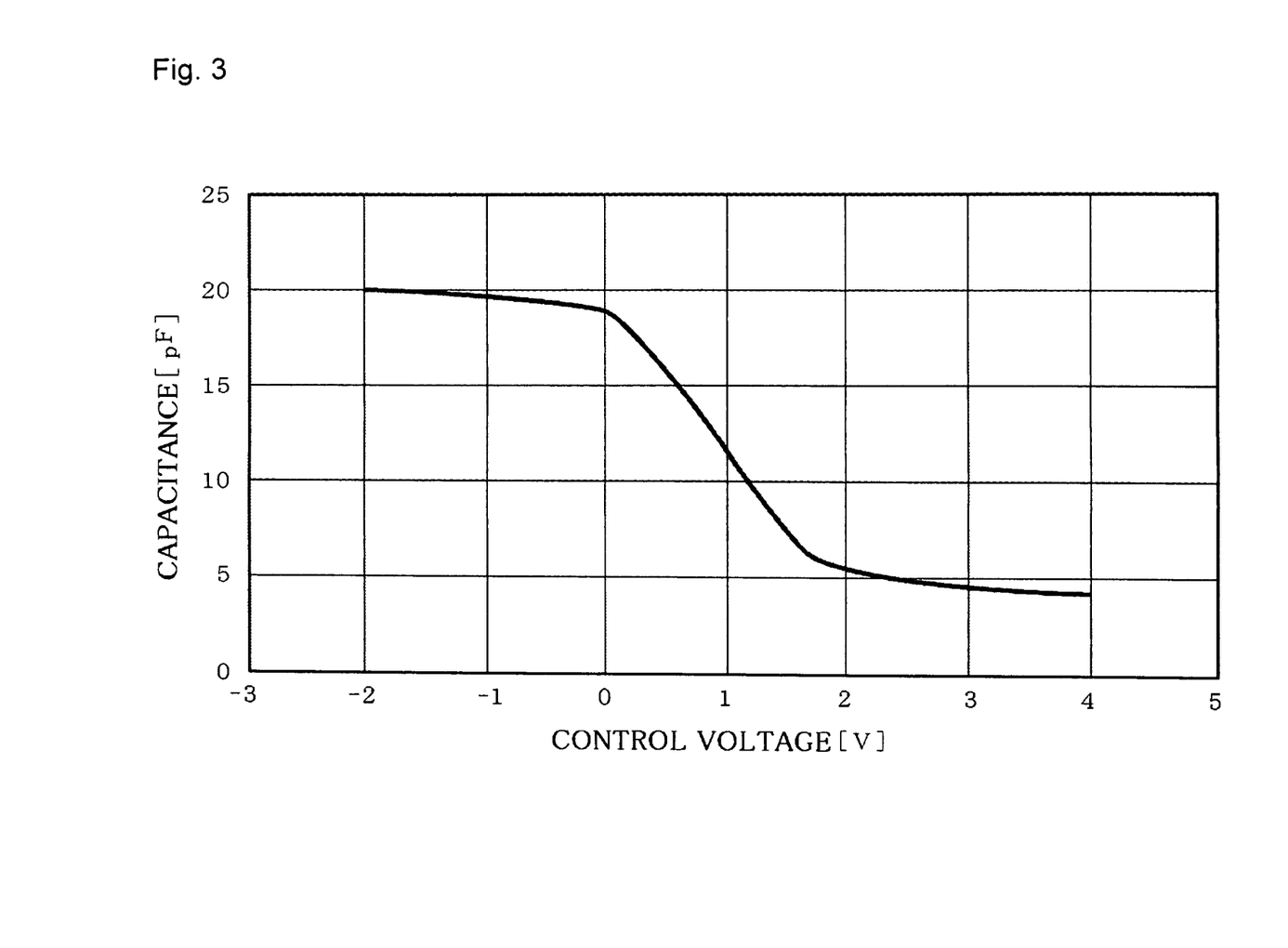
FIG. 3 is a characteristic graph illustrating a relation between a control voltage and a capacitance value of voltage variable capacitors of the present invention.

FIG. 3 illustrates a relation between the control voltage and the capacitance values of the voltage variable capacitors of this embodiment. The characteristic illustrated in FIG. 3 illustrates the capacitance value between the nodes A, B when n is set to 10, VB1 to 0.5 V, VB2 to 0.65 V, VB3 to 0.8 V, VB4 to 0.95 V, VB5 to 1.1 V, VB6 to 1.25 V, VB7 to 1.4 V, VB8 to 1.55 V, VB9 to 1.7 V, and VB10 to 1.95 V, and the control voltage applied to the node A is varied from −2 V to 4 V. In this example, the same capacitance value is used for the MOS capacitance elements CM1 to CM10, and the same capacitance value is used likewise for the capacitors C1 to C10. Thus, the relation between the control voltage and the capacitance value is linear when the control voltage is between about 0.2 V and about 1.3 V, as illustrated in FIG. 3.

Here, the MOS capacitance elements described in Patent Document 1 formed of MOS transistors each having a short-circuited source and drain are compared with the MOS capacitance elements used in the above-described embodiments. The MOS transistors described in Patent Document 1 each include three terminals: a gate terminal, a source-drain terminal, and a sub-terminal. The sub-terminal is grounded, and a constant bias voltage is applied to the gate terminal. Then, the voltage of the source-drain terminal is varied, so as to vary the capacitance between the gate terminal and the source-drain terminal. In this case, for example, when a bias voltage of 1 V is applied to the gate terminal, an inversion layer (N layer) is formed beneath a gate oxide film. When the voltage of the source-drain terminal is 0 V, a source-drain layer (N layer) and the inversion layer turn to a continuity state. Thus, the capacitance value between the gate terminal and the source-drain terminal is determined by the gate oxide film, and becomes a maximum capacitance value. The source-drain terminal is an N-type semiconductor, and the layer of the sub-terminal is a P-type semiconductor. So, a negative voltage cannot be applied to the source-drain terminal. This is because when the voltage of the source-drain terminal is turned to a negative side, the diode turns to a forward direction.

Next, when the voltage of the source-drain terminal is increased sequentially, the diode constituted of the source-drain layer (N-type semiconductor) and the layer of the sub-terminal (P-type semiconductor) becomes a reverse bias. Thus, a depletion layer is generated in the source-drain layer, and the inversion layer and the source-drain layer are no longer in the continuity state. The capacitance value at this time decreases because the capacitance formed of the gate oxide film and the depletion layer is connected in series. When the voltage of the source-drain terminal is increased further, the depletion layer thickens and the capacitance value decreases further.

Therefore, when the source and drain and the inversion layer are in a continuity state, the capacitance determined by the gate oxide film and the parasitic resistance of the inversion layer become elements connected in series. In a state that the depletion layer is generated in the source and drain, three elements of the capacitance determined by the gate oxide film, the parasitic resistance of the inversion layer, and the capacitance formed by the depletion layer become elements connected in series. In either case, it becomes a state that the parasitic resistance of the inversion layer is connected in series, and thus decrease in a Q value occurs.

In this respect, in the MOS capacitance elements according to the above-described embodiment, a thin inversion layer due to a carrier accumulation effect may be formed when the gate electrode 31 is biased to negative with respect to the sub-contact part 4, and as a parasitic resistance in this inversion layer, a resistance in a vertical direction acts on the sub-contact part 4. Accordingly, the value thereof is sufficiently small with respect to the substrate resistance of the sub-contact part 4, and hence the Q value is not decreased. The substrate resistance of the sub-contact part 4 affects the Q value, but its resistance value is sufficiently smaller than that in the MOS capacitance elements in Patent Document 1. Thus, capacitance elements with a high Q value can be achieved.

Moreover, the above-described embodiment provides the following effects. A plurality of series circuits each formed of a MOS capacitance element CMk and a capacitor Ck, which is non-variable capacitance element, are connected in parallel, a bias voltage is applied to the gate side of the MOS capacitance element CMk, and a control voltage is supplied to the sub-contact part 4 side. Assuming that the threshold voltage Vt when the MOS transistors are formed is Vt, the difference between bias voltages of adjacent voltages is set smaller than the threshold voltage Vt. Therefore, the capacitance values of the MOS capacitance elements CM1 to CMn steeply decrease sequentially, and so a large variable width regarding a capacitance value can be obtained as illustrated in FIG. 3, further including the point of the structure of the MOS capacitance elements CMk as already described.

Since the control voltage and the capacitance value are in a good linear relation, there is an effect that this voltage controlled variable capacitor can be applied easily to a VCO. Further, for a general MOS transistor, a gate electrode is used as a mask by self-alignment, and hence the distance between a source region and a gate electrode is close, which results in a large parasitic capacitance. In this respect, since the sub-contact part 4 is used in the MOS capacitance elements, a large distance can be taken between the sub-contact part 4 and the gate electrode 31, thereby providing an advantage that the parasitic capacitance can be reduced.

In the present invention, the electrode M1 may be the gate electrode 31 itself, and the structure in this case is such that the electrode M3 is provided to oppose the gate electrode 31 via an insulating layer. The bias voltage is applied to the gate electrode 31 via a lead-out electrode.

In the above-described example, the same capacitance value is used in the MOS capacitance elements CM1 to CMn, and the same capacitance value is used likewise in the capacitances C1 to C10. Thus, as illustrated in FIG. 3, the relation between the control voltage and the capacitance value is linear when the control voltage is between about 0.2 V and about 1.3 V. However, in the VCO, it is not required that the relation between the control voltage and the capacitance value be linear, but it is required that the relation between the control voltage and an oscillation frequency be linear. The relation among a series capacitance C1, a parallel capacitance C0, and a series inductance L1 when a crystal resonator is represented by an equivalent circuit, a capacitance CV of a voltage-variable capacitance part connected to the crystal resonator, and an oscillation frequency f of an oscillation circuit is represented by $f = 1/2\pi(L1 \cdot K)^{1/2}$. The voltage-variable capacitance part corresponds to the capacitance between the nodes A and B in FIG. 1. Further, K is represented by the following equation.

$$K = \{C1(C0+CV)\}/(C1+C0+CV)$$

Here, CV and f are in a nonlinear relation, and CV and the control voltage Vb applied to the voltage variable capacitance part (voltage applied to the node A in FIG. 1) are also in a nonlinear relation. Accordingly, it is preferred that the following techniques for example be employed so that the relation between Vb and f becomes linear (linear relation) as much as possible.

Figure 4:
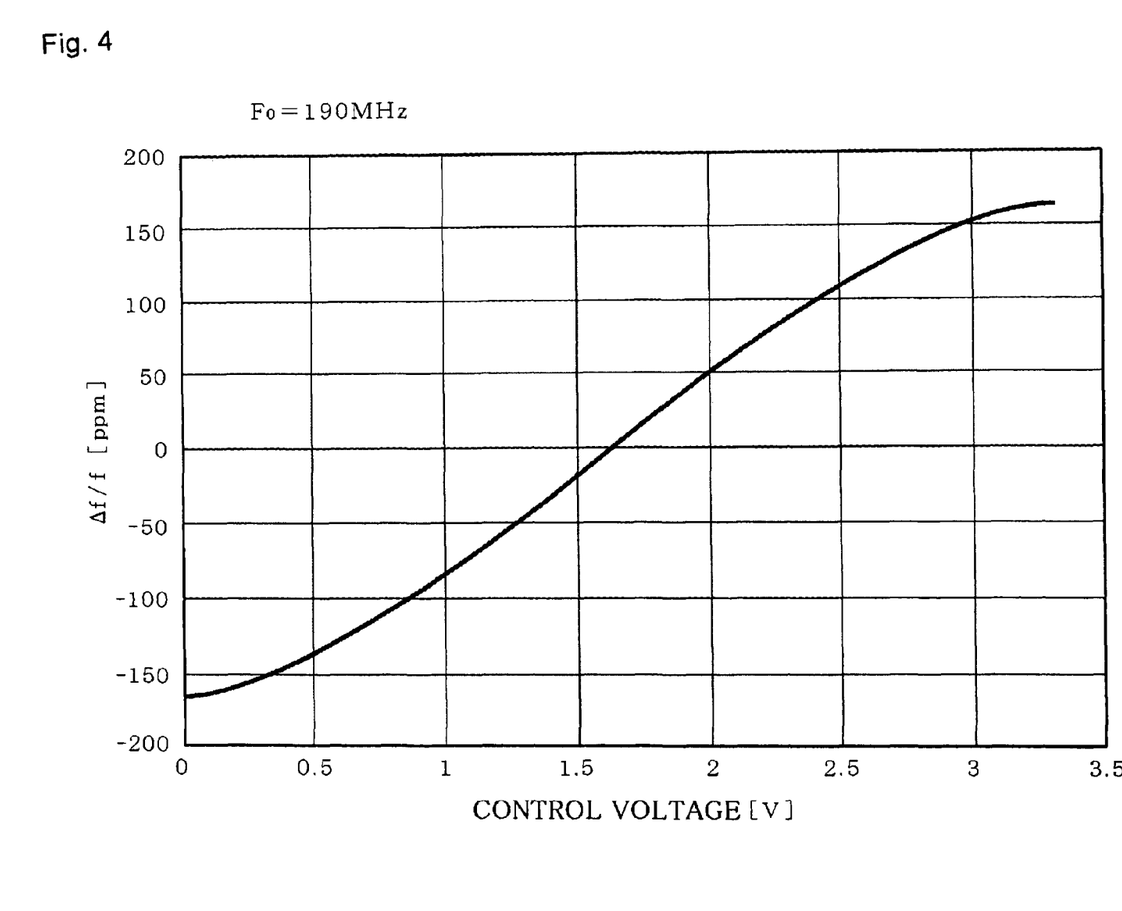
FIG. 4 is a illustrating an amount of change in parallel resonance frequency when weighting on capacitance values (CM1 to CM10 and C1 to C10) of FIG. 1 are changed and a resonance circuit is connected (that is, an oscillation frequency when a VCO is formed)

1) A technique to match the relation of the control voltage versus a capacitance value with a desired characteristic by adjusting weighting on a capacitance of one or both of a plurality of MOS capacitance elements and a plurality of non-variable capacitors 2) A technique to match the relation of the control voltage versus a capacitance value with a desired characteristic by adjusting the fixed bias voltage applied to the connection point between the MOS capacitance elements and the non-variable capacitor 3) A technique to use the technique 1) and 2) in combination FIG. 4 illustrates the relation between the control voltage and an amount of change in a parallel resonance frequency when a voltage variable capacitor is structured by the technique 1) and a resonance circuit is formed by connecting this voltage variable capacitor with a crystal resonator of 190 MHz (that is, an oscillation frequency when a VCXO is formed). Here, an example of weighting on the capacitance of the MOS capacitance element is such that capacitances are changed from each other among all or part of the MOS capacitance elements CM1 to CMn (the area, thickness, and the like of a gate oxide film are changed). Further, an example of weighting on the non-variable capacitance elements is such that capacitances are changed from each other among all or part of the capacitors C1 to Cn.

In general, linearity of 10% or lower is required in the VCXO. In this respect, the linearity in FIG. 4 falls within 5% sufficiently, and good linearity is obtained. In addition, here the MOS capacitance elements have been described with an example of the non-variable capacitor having the MOS structure as illustrated in FIG. 2 formed of the N-well layer 21, the gate oxide film 31, and the poly-silicon gate electrode 31, that is, a MIM (Metal Insulator Metal) structure. However, the type of an N-type diffusion layer and the material of a gate electrode need not be limited to them. For example, the gate electrode may be formed of metal. Further, the capacitor Ck which is a non-variable capacitor need not be of the MIM structure.

Figure 5:
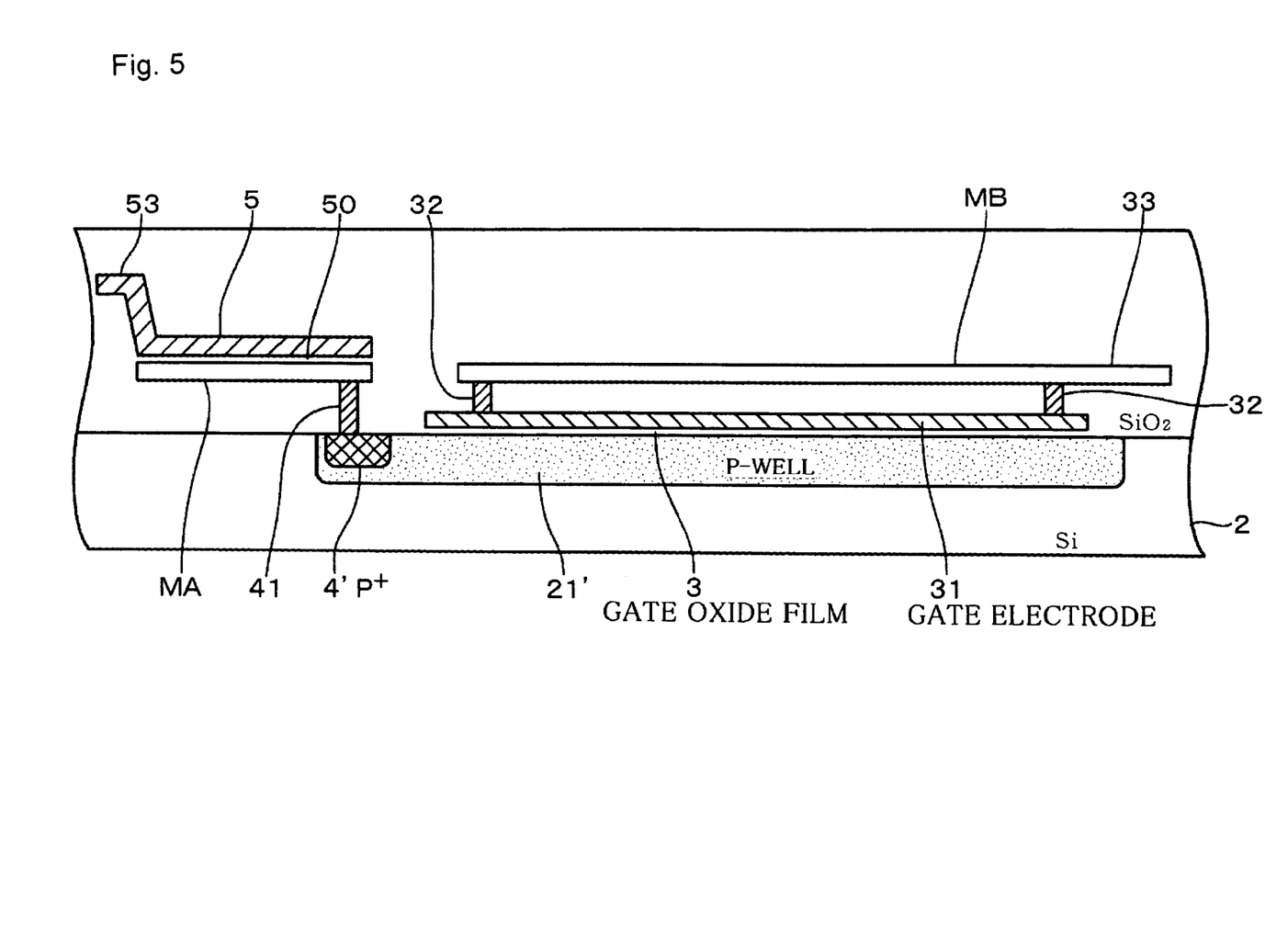
FIG. 5 is a cross-sectional view illustrating a structure of a MOS capacitance element used in a modification example of the first embodiment.

Moreover, instead of the N-well layer 21, a P-well layer which is a P-type well layer may also be used to achieve similar functions. In this case, the sub-contact part 21 is constituted of a P$^+$ layer having a higher concentration of P-type impurities than the P-well layer. This would be a structure in which the upper side and the lower side of the MOS capacitance elements CM1 to CM10 illustrated in FIG. 1 are reversed. Specifically, the structure in FIG. 2 is changed such that electrodes 5 on one end sides of the capacitors C1 to C10 oppose the upper sides of the electrodes MA connected to the sub-contact part 4 via an insulating layer forming a capacitor, and so the electrodes 5 on the one end sides of the capacitors C1 to C10 do not oppose the upper sides of the electrodes MB. FIG. 5 is a cross-sectional view illustrating a MOS capacitance element using the P-well layer corresponding to a modification example of the first embodiment, where numerals "21'" and "4'" are assigned to the P-well layer and the P$^+$ layer, respectively. Bias voltages are applied to the electrodes MA from the bias voltage supply unit 1. The electrodes MB are connected to the node A, and the control voltage is applied thereto.

In the above structure, when a non-variable capacitor is formed on the gate electrode 31 of the MOS capacitance element in the present invention, the electrode 51 (see FIG. 2) may be provided with an insulating layer interposed between this electrode and the gate electrode 31 without having the electrode MB. In this case, a bias voltage Vk is applied to the gate electrode 31 without intervention of the electrode MB.

FIG. 6 is an example of a voltage controlled oscillator to which the voltage controlled variable capacitor of the present invention is applied, in which numeral 5 denotes a crystal resonator, numeral 6 denotes a differential amplifier, and numeral 7 denotes a control voltage output unit, where an oscillation output is taken out via one end side of the crystal resonator 5. Two groups of the already-described voltage controlled variable capacitors are connected to both ends of the crystal resonator 5. That is, the two groups of the voltage controlled variable capacitors are in the same structure.

Figure 7:
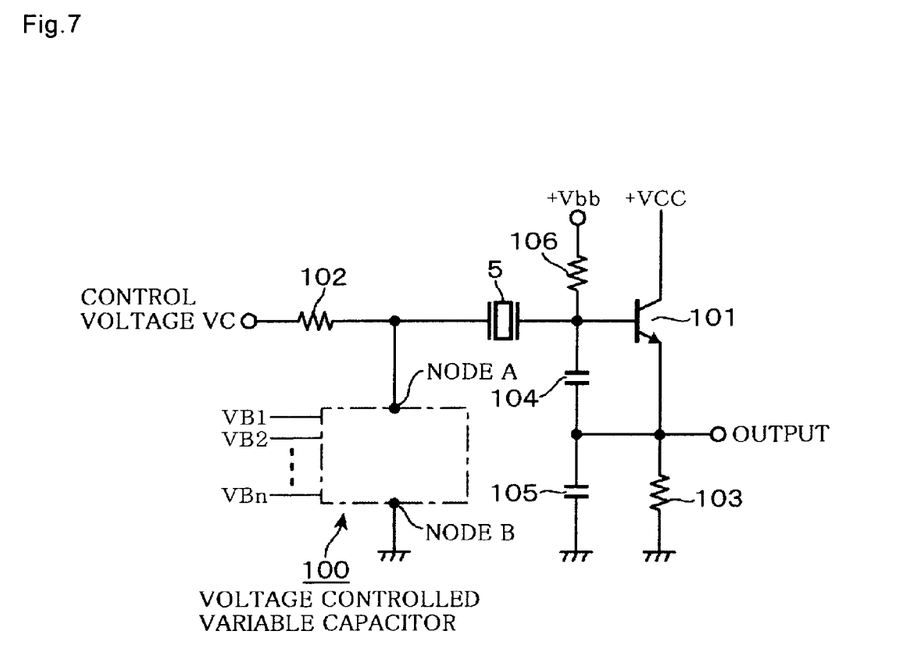
FIG. 7 is a circuit diagram illustrating a structure example of a circuit of a voltage controlled oscillator using the voltage controlled variable capacitor according to the first embodiment.

FIG. 7 is another example of a voltage controlled oscillator to which the voltage controlled variable capacitor of the present invention is applied, in which a Colpitts circuit is used as an oscillator circuit used for the voltage controlled oscillator. In FIG. 7, numeral 100 denotes the voltage controlled variable capacitor illustrated in FIG. 1, and a bias resistor R described in FIG. 1 is located in the frame of a dashed line. Numeral 101 denotes a transistor forming an amplifier, and numerals 102, 103 denote a resistor, numerals 104, 105 denote a capacitor, numeral 106 denotes a resistor, symbol VCC denotes a power supply voltage, and symbol Vbb denotes a bias voltage supplied to the base of the transistor 101. In the circuit of FIG. 7, the node B is grounded, but when it is structured without grounding the node B, the bias resistor R is not necessary.

Note that the voltage controlled oscillator to which the present invention is applied may be one using what is called an LC resonance circuit.

The circuit of the voltage controlled variable capacitor according to the already-described first embodiment is a structure devised on the assumption that the parasitic capacitance between the lower electrode (N-well 21) of the MOS capacitance element and the silicon substrate (part corresponding to numeral 2) is large. In a general semiconductor process, the lower electrode of the MOS capacitance element and the silicon substrate are separated electrically by PN separation, and thus a large junction capacitance exists at the lower electrode of the MOS capacitance element. Accordingly, the first embodiment is structured such that the control voltage is supplied to the lower electrode of the MOS capacitance element, and the potential of the lower electrode is thus prevented from being changed by a high frequency (or is fixed in the aspect of alternating current), thereby eliminating or suppressing the influence of the parasitic capacitance.

On the other hand, in this structure, it is necessary to give the bias voltage VBk to the upper electrode (gate electrode) of the MOS capacitance element. Thus, to prevent this direct current bias from being applied to the oscillator circuit side, it is necessary to connect the capacitor Ck as a non-variable capacitor in series to the MOS capacitance element CMk for cutting the direct current bias. Therefore, the larger the capacitance value of the capacitor Ck than the capacitance value of the MOS capacitance element CMk, the larger the variable capacitance ratio as a variable capacitor can be obtained. Although the capacitance value of the capacitor Ck can be made much larger by forming the capacitor in an area outside the upper part of the MOS capacitor, this makes the device large, and the parasitic capacitance between the electrode on the MOS capacitor side in the capacitor Ck and the silicon substrate becomes large. It is hence not a good idea. Accordingly, when it is attempted to provide the capacitor Ck above the gate electrode, a certain degree of restriction on the size of the variable capacitance ratio is inevitable.

On the other hand, in a process by which the lower electrode of the MOS capacitance element can be electrically separated with respect to the silicon substrate by an oxide film of SOI (Silicon On Insulator) or the like, the parasitic capacitance existing between the lower electrode of the MOS capacitance element and the silicon substrate is sufficiently small as compared to the PN separation. Thus, the same function as in FIG. 1 can be achieved without employing the structure of FIG. 1.

Next, a voltage controlled variable capacitor according to a second embodiment of the present invention will be described with reference to FIG. 8 to FIG. 11. The second embodiment is a preferred example for the case where the parasitic capacitance existing between the lower electrode of the MOS capacitance element and the silicon substrate is sufficiently small as compared to the PN separation.

Figure 8:
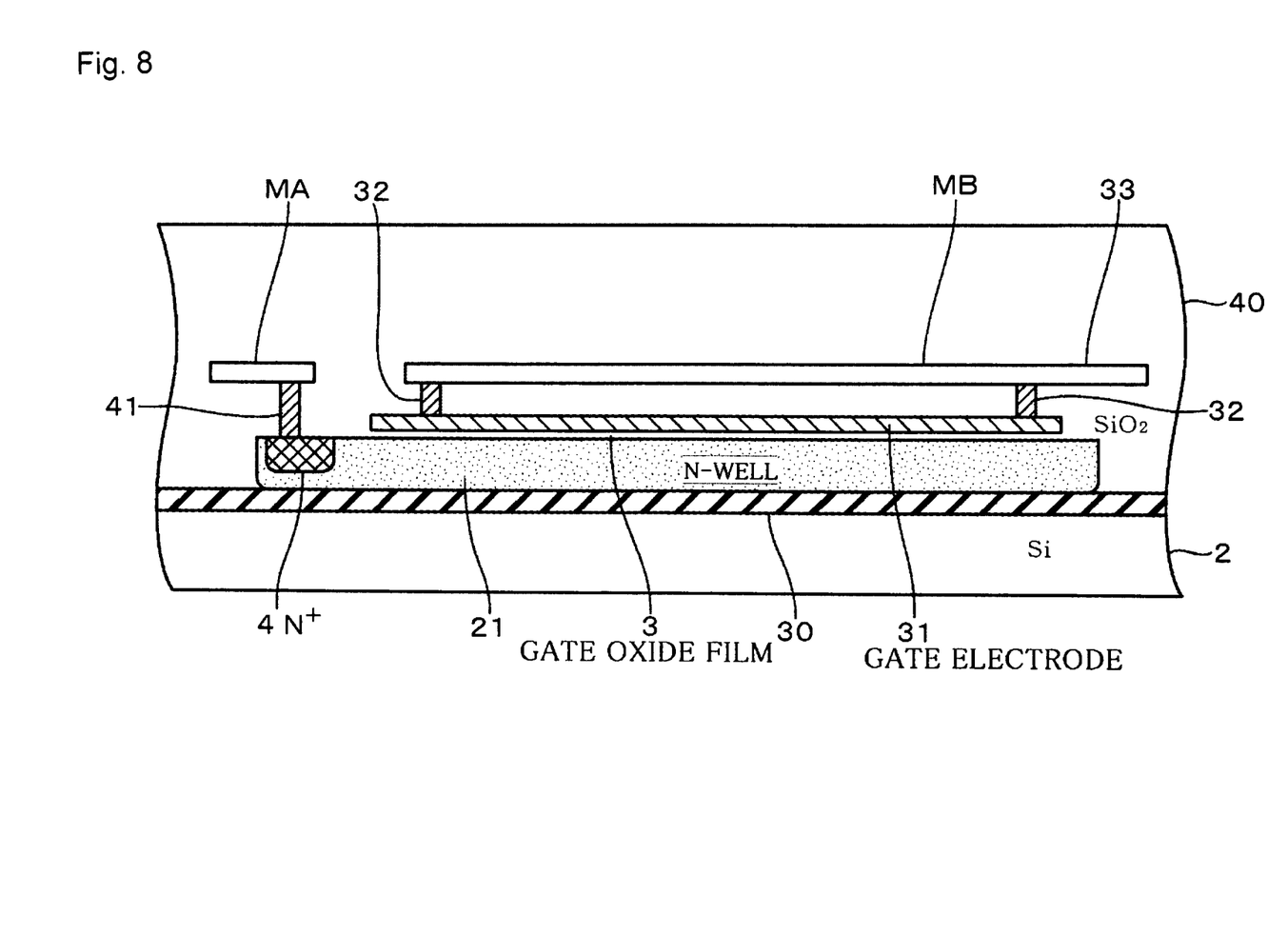
FIG. 8 is a cross-sectional view illustrating a structure of a MOS capacitance element used in a second embodiment of the voltage controlled variable capacitor of the present invention.
Figure 9:
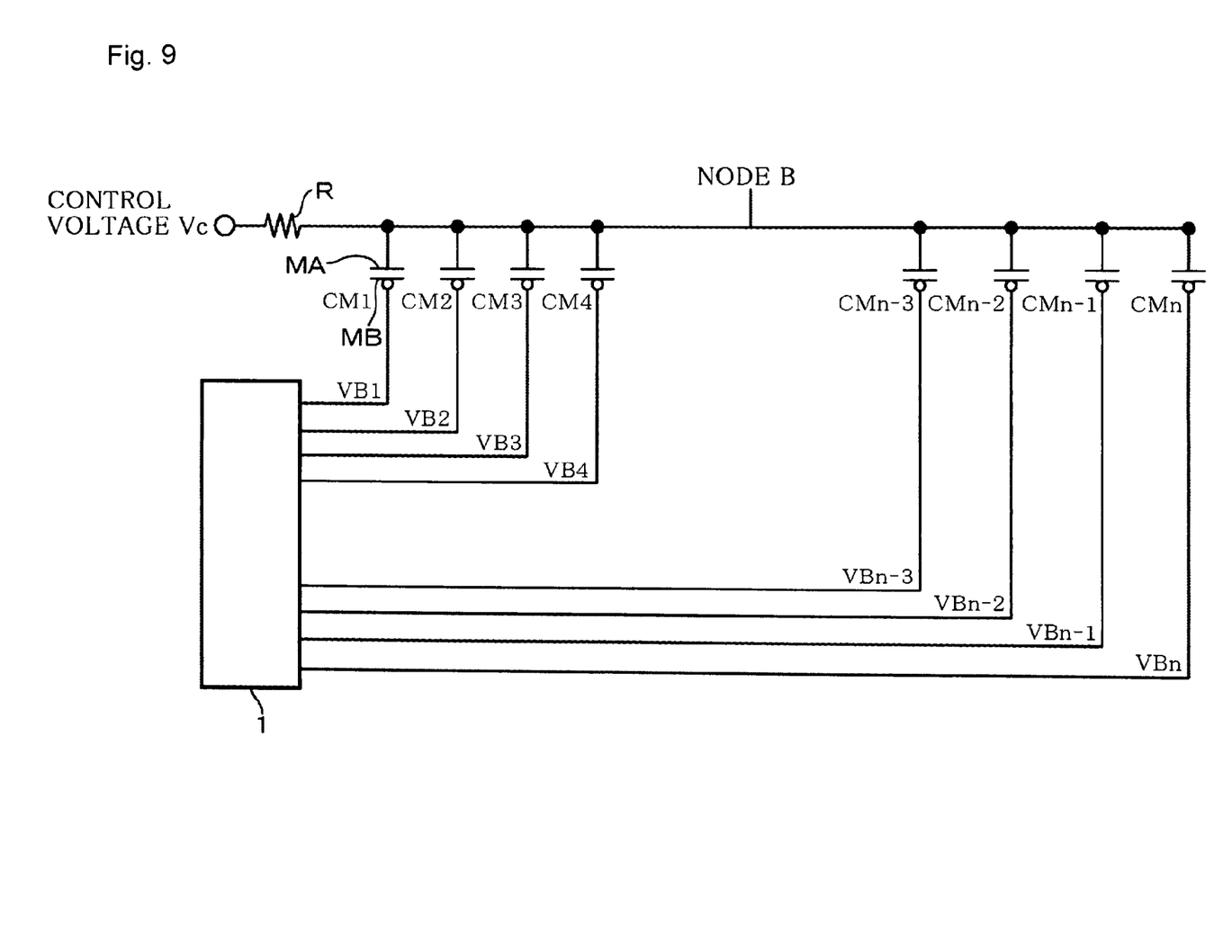
FIG. 9 is a circuit diagram illustrating the second embodiment of the voltage controlled variable capacitor of the present invention.

The device structure illustrated in FIG. 8 shows the MOS capacitance element used in the second embodiment. This structure differs from the structure in FIG. 2 in that a silicon oxide film, for example, as an insulating film 30 is formed between the MOS capacitance element and the silicon substrate 2, and that the capacitor Ck is not included. FIG. 9 illustrates a circuit of a voltage controlled variable capacitor according to the second embodiment. In FIG. 9, in the MOS capacitance elements CM1 to CMn, the electrode MB connected to the gate electrode 31 is described on the lower side, and the electrode MA connected to the N-well 21 is described on the upper side. Then it is structured such that each contact layer 4 of the MOS capacitance element CMk is connected in common via each electrode MA, and the control voltage is supplied from a not-illustrated control voltage output unit via the resistor R to a node B as a common connection point. In addition, the node B is a node on the side connected to the oscillator circuit.

In this example, since the parasitic capacitance existing between the lower electrode of the MOS capacitance element CMk and the silicon substrate 2 is small, the lower electrode side (N-well 21 side) can thus be brought into a free state in the aspect of alternating current (state that the potential changes by a high frequency). Accordingly, the gate electrode 31 side of the MOS capacitance element CMk can be fixed in the aspect of alternating current, and thus the bias voltage can be supplied to the gate electrode 31 without providing the bias resistor from the bias voltage supply unit 1. Consequently, the capacitor Ck as a non-variable capacitor is no longer necessary. In the voltage controlled variable capacitor illustrated in FIG. 9, the gate electrode 31 as a supply point of each bias voltage VBk is grounded in the aspect of alternating current, and thus the capacitor between the gate electrode VBk and the node B is controlled by the control voltage VC.

Figure 10:
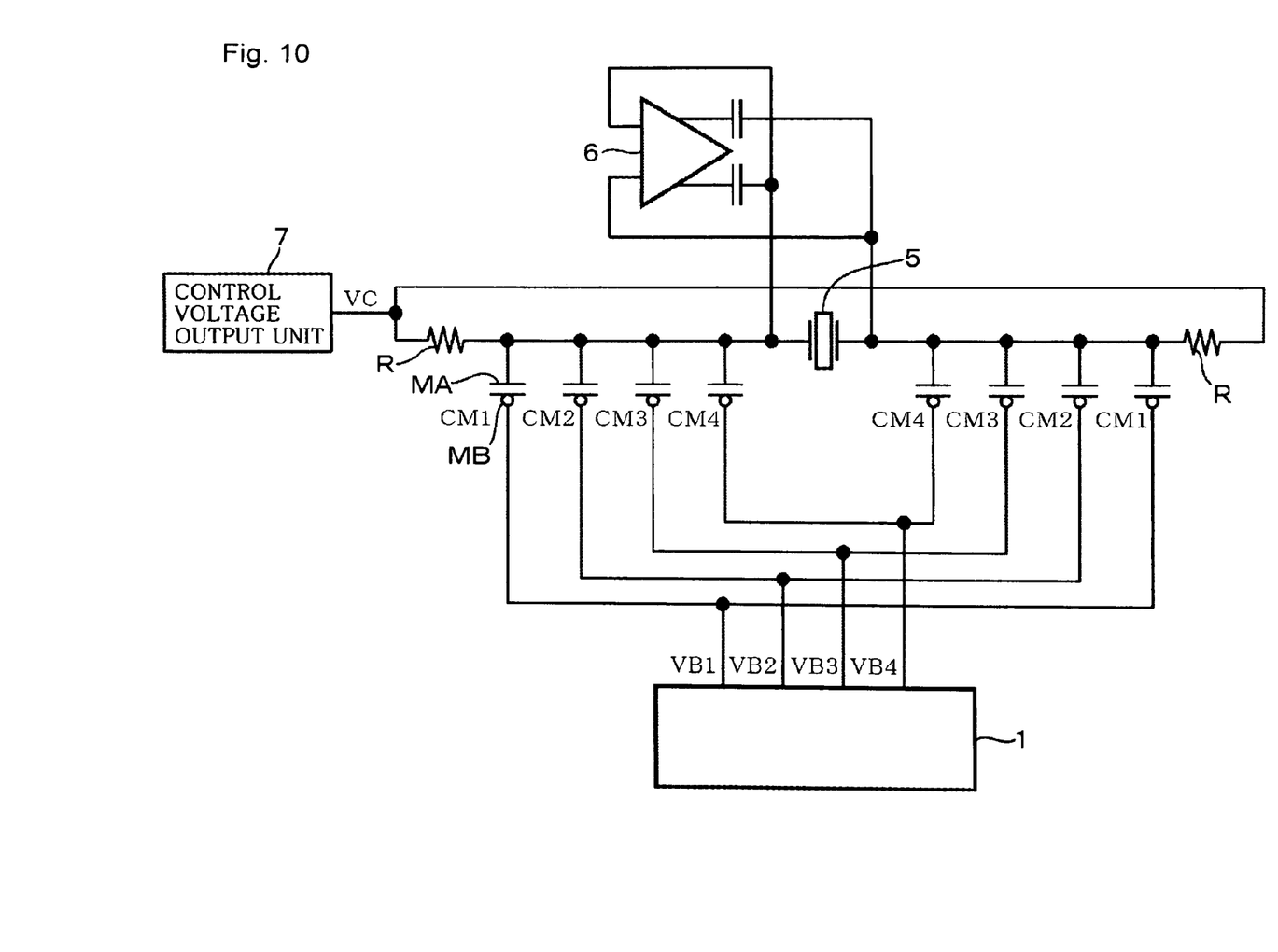
FIG. 10 is a circuit diagram illustrating a structure example of a circuit of a voltage controlled oscillator using the voltage controlled variable capacitor according to the second embodiment.

FIG. 10 is an example of a voltage controlled oscillator to which the voltage controlled variable capacitor of the present invention is applied. In this example, two voltage controlled variable capacitors of the second embodiment are used, but one voltage controlled variable capacitor may be used. By the structure illustrated in FIG. 10, each node of the bias voltages VB1 to VBn becomes a virtual grounding point in the aspect of alternating current, and thus there is an advantage that it is equivalent to giving an ideal bias (zero impedance) even when the impedance of the circuit of the bias voltage supply unit 1 is high (there is a resistance).

Figure 11:
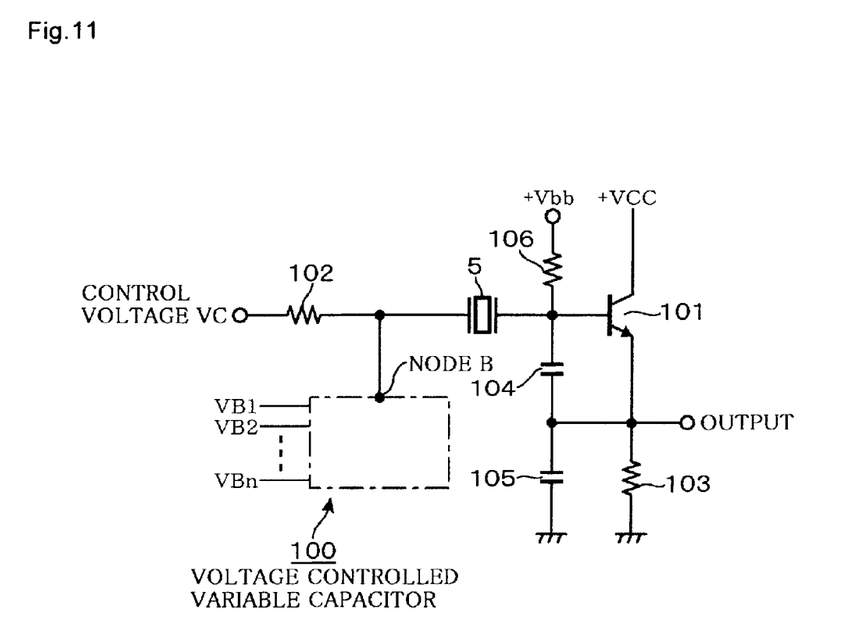
FIG. 11 is a circuit diagram illustrating a structure example of a circuit of a voltage controlled oscillator using the voltage controlled variable capacitor according to the second embodiment.

FIG. 11 is another example of a voltage controlled oscillator to which the voltage controlled variable capacitor of the second embodiment is applied, in which a Colpitts circuit is used as an oscillator circuit used for the voltage controlled oscillator.

Even when the SOI process is used, the parasitic capacitance existing between the lower electrode of the MOS capacitance element CMk and the silicon substrate 2 is not zero, and thus it is preferred that which of the structure of the first embodiment and the structure of the second embodiment is advantageous be determined depending on the used process, so as to appropriately select and use one of these structures. In addition, the bias resistor R (or 102) becomes necessary or unnecessary depending on how to provide it in the circuit to which the voltage controlled variable capacitor of the present invention is applied.

What is claimed is:

1. A voltage controlled variable capacitor, comprising:
a plurality of MOS capacitance elements each comprising an $N^+$ type well layer a gate electrode formed on the well layer via a gate oxide film, and a contact layer formed of an $N^+$ layer containing a higher concentration of N type impurities than that of the well layer and formed at a position separated from the gate electrode in a surface direction in the well layer;
wherein the contact layer of each one of the plurality of MOS capacitance elements are electrically connected in common;
wherein a bias voltage supply unit for supplying DC bias voltages different from each other is provided to gate electrodes of the respective MOS capacitance elements;
wherein the DC bias voltages are set so that the voltage differences between the DC bias voltages having adjacent magnitudes are smaller than a threshold voltage Vt of the MOS capacitance element to which the larger bias voltage of each difference is applied, wherein Vt is a voltage occurring between the well layer and the gate electrode when a depletion layer formed in the well layer is eliminated when the voltage of the gate electrode with respect to the well layer has increased, and
wherein a control voltage is supplied to the contact layers to thereby control a capacitance value between a common connection point of the plurality of MOS capacitance elements and gate electrode sides of the MOS capacitance elements.

2. A voltage controlled oscillator using a voltage controlled variable capacitor, wherein the voltage controlled variable capacitor according to claim 1 is used.

3. The voltage controlled oscillator according to claim 2, wherein weighting on a capacitance is performed in at least uric of group of the plurality of MOS capacitance elements and a group of the plurality of non-variable capacitance elements so that the control voltage and an oscillation frequency are in a direct proportional relation.

4. The voltage controlled oscillator according to claim 3, wherein weighting on the bias voltages is performed so that the control voltage and an oscillation frequency are in a direct proportional relation.

5. The voltage controlled oscillator according to claim 2, wherein weighting on the bias voltages is performed so that the control voltage and an oscillation frequency are in a direct proportional relation.

6. The voltage controlled oscillator according to claim 1, wherein weighting on a capacitance is performed in at least one of a group of the plurality of MOS capacitance elements and a group of the plurality of non-variable capacitance elements so that the control voltage and an oscillation frequency are in a dircet proportional relation.

7. The voltage controlled variable capacitor of claim 1 wherein each non-variable capacitor is vertically integrated with one MOS capacitive element on a single semiconductor substrate,
so that one electrode of the non-variable capacitor is the gate electrode an MOS capacitive element.

8. The voltage controlled variable capacitor of claim 1 further comprising:
a plurality or non-variable capacitance elements having one end connected respectively to the gate electrodes of the MOS capacitance elements, and wherein other ends of said plurality of non-variable capacitance elements are connected in common; and
wherein a control voltage is applied for controlling the capacitance of the voltage controlled capacitor between the common connection of the non-variable capacitors and the common connection of the contact layers of the plurality of MOS capacitance elements.

* * * * *